United States Patent
Kimura et al.

(10) Patent No.: US 11,099,499 B2
(45) Date of Patent: Aug. 24, 2021

(54) IMAGE REMOVING DEVICE, METHOD FOR RECYCLING RECORDING MATERIAL, AND IMAGE REMOVING METHOD

(71) Applicant: Mitsubishi Chemical Corporation, Chiyoda-ku (JP)

(72) Inventors: Hidetaka Kimura, Chiyoda-ku (JP); Keita Kawanami, Chiyoda-ku (JP)

(73) Assignee: Mitsubishi Chemical Corporation, Chiyoda-ku (JP)

( * ) Notice: Subject to any disclaimer, the term of this patent is extended or adjusted under 35 U.S.C. 154(b) by 0 days.

(21) Appl. No.: 16/368,507

(22) Filed: Mar. 28, 2019

(65) Prior Publication Data

US 2019/0219943 A1    Jul. 18, 2019

Related U.S. Application Data

(63) Continuation of application No. PCT/JP2017/035501, filed on Sep. 29, 2017.

(30) Foreign Application Priority Data

Sep. 30, 2016    (JP) .............................. JP2016-194070

(51) Int. Cl.
     *B32B 43/00*      (2006.01)
     *G03G 15/045*      (2006.01)
     (Continued)

(52) U.S. Cl.
     CPC .......... *G03G 15/045* (2013.01); *B41J 29/373* (2013.01); *G03G 21/00* (2013.01);
     (Continued)

(58) Field of Classification Search
     CPC . B32B 38/10; B32B 43/006; Y10T 156/1158; Y10T 156/1168;
     (Continued)

(56) References Cited

U.S. PATENT DOCUMENTS 6,045,904 A * 4/2000 Torikoshi ............... B41M 5/529
     156/240
2002/0063350 A1* 5/2002 Matsumoto ......... B29C 35/0805
     264/1.36

(Continued)

FOREIGN PATENT DOCUMENTS

EP      2 048 547 A1      4/2009
JP      60-244576      12/1985

(Continued)

OTHER PUBLICATIONS

International Search Report dated Nov. 7, 2017 in PCT/JP2017/035501 filed Sep. 29, 2017 (with English Translation).

(Continued)

*Primary Examiner* — Mark A Osele
*Assistant Examiner* — Nickolas R Harm
(74) *Attorney, Agent, or Firm* — Oblon, McClelland, Maier & Neustadt, L.L.P.

(57) ABSTRACT

The present invention configures an image removing device capable of certainly and cleanly removing an image comprising an image forming substance and formed on the surface of a plastic recording material. An image removing device is provided with a means 2 for applying an ultraviolet curable resin and a means 4 for emitting ultraviolet light above a conveyance path for a recording material 1 on the surface of which an image is formed, and removes the image from the surface of the recording material 1 by transferring an image forming substance 1a to the ultraviolet curable resin and attaching the image forming substance, together with the ultraviolet curable resin, to the surface of a release body 5 by irradiating the ultraviolet light.

11 Claims, 5 Drawing Sheets

(51) Int. Cl.
*B41J 29/373* (2006.01)
*G03G 21/00* (2006.01)
*B32B 38/10* (2006.01)

(52) U.S. Cl.
CPC ............. *B32B 38/10* (2013.01); *B32B 43/006* (2013.01); *B41J 2202/37* (2013.01); *G03G 2215/00493* (2013.01); *G03G 2215/0426* (2013.01); *Y10T 156/1158* (2015.01); *Y10T 156/1168* (2015.01); *Y10T 156/1195* (2015.01); *Y10T 156/1917* (2015.01); *Y10T 156/1994* (2015.01)

(58) Field of Classification Search
CPC ......... Y10T 156/1195; Y10T 156/1917; Y10T 156/1994
USPC .......................... 156/712, 714, 719, 753, 767
See application file for complete search history.

(56) References Cited

U.S. PATENT DOCUMENTS

| | | | |
|---|---|---|---|
| 2003/0113544 A1* | 6/2003 | Tokuda | C08F 290/144 428/413 |
| 2007/0039677 A1 | 2/2007 | Chapman | |
| 2008/0317487 A1* | 12/2008 | Murakami | G03G 7/0026 399/45 |
| 2012/0312457 A1* | 12/2012 | Hosoe | B29C 39/148 156/182 |
| 2017/0114590 A1* | 4/2017 | Shinozaki | E06B 9/24 |

FOREIGN PATENT DOCUMENTS

| | | |
|---|---|---|
| JP | 1-297294 | 11/1989 |
| JP | 11-45033 | 2/1999 |
| JP | 11-194546 | 7/1999 |
| JP | 11-194685 | 7/1999 |
| JP | 2000-98648 | 4/2000 |
| JP | 2001-56579 | 2/2001 |
| JP | 2001-350379 | 12/2001 |
| JP | 2004-151237 | 5/2004 |
| JP | 2007-279619 | 10/2007 |

OTHER PUBLICATIONS

Written Opinion dated Nov. 7, 2017 in PCT/JP2017/035501 filed Sep. 29, 2017.
Extended European Search Report dated Oct. 10, 2019, in Patent Application No. 17856442.3, 5 pages.

* cited by examiner

[Fig.1]
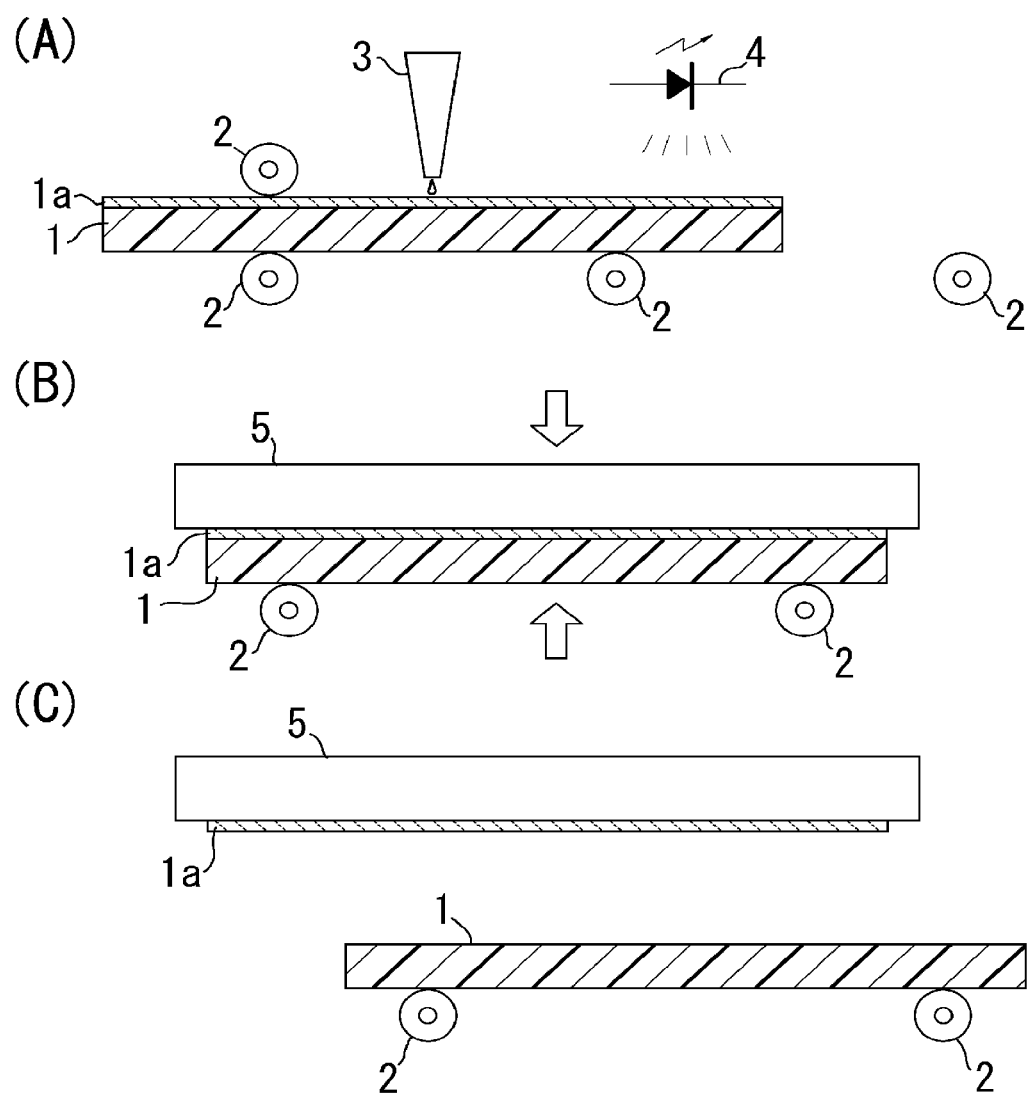

[Fig.2]
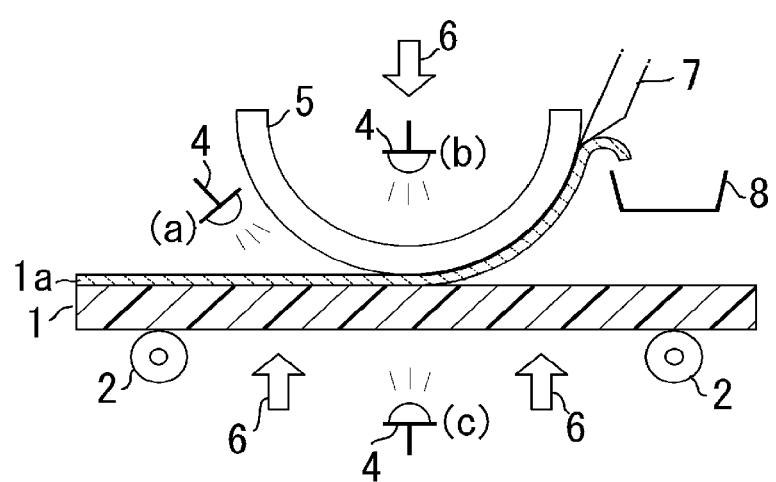

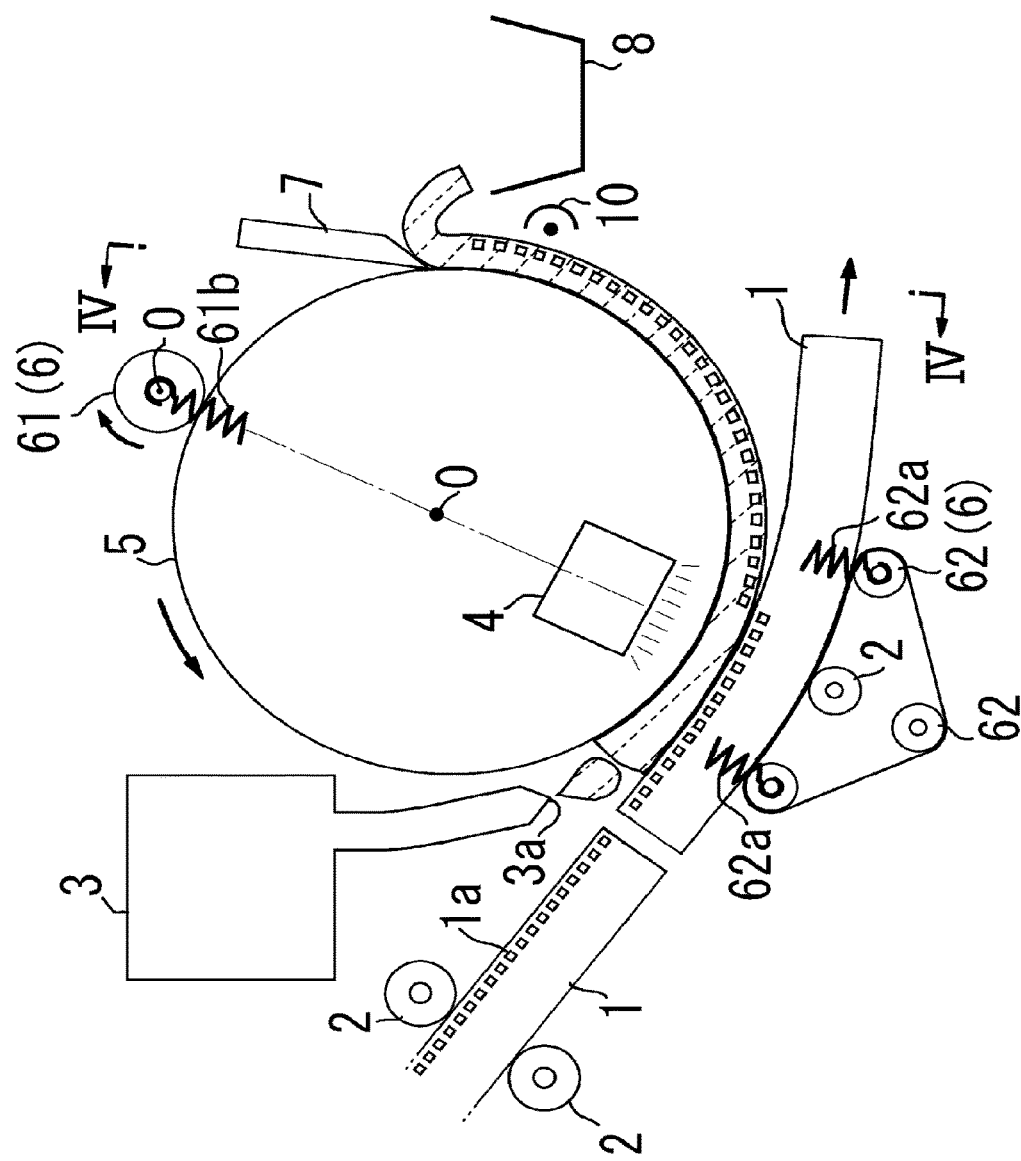
[Fig. 3]

[Fig.4]
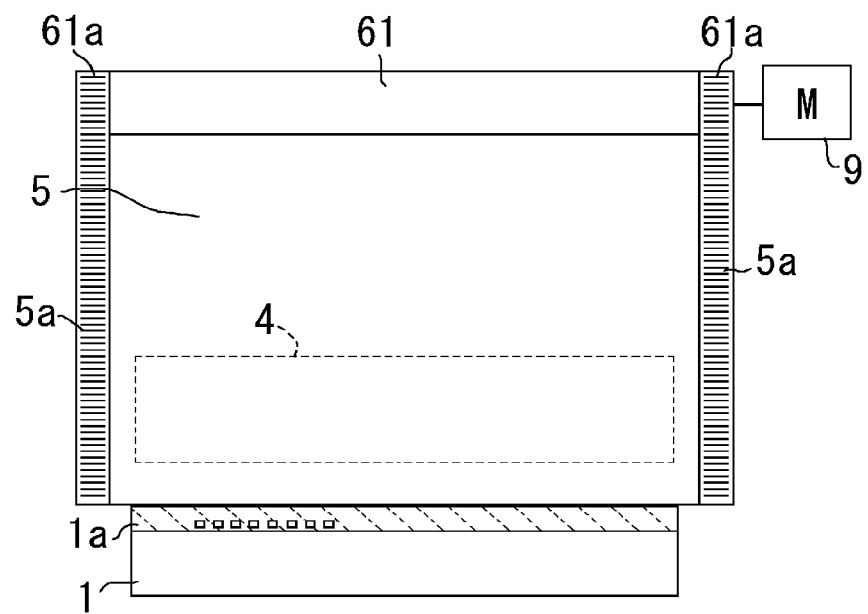

[Fig.5]
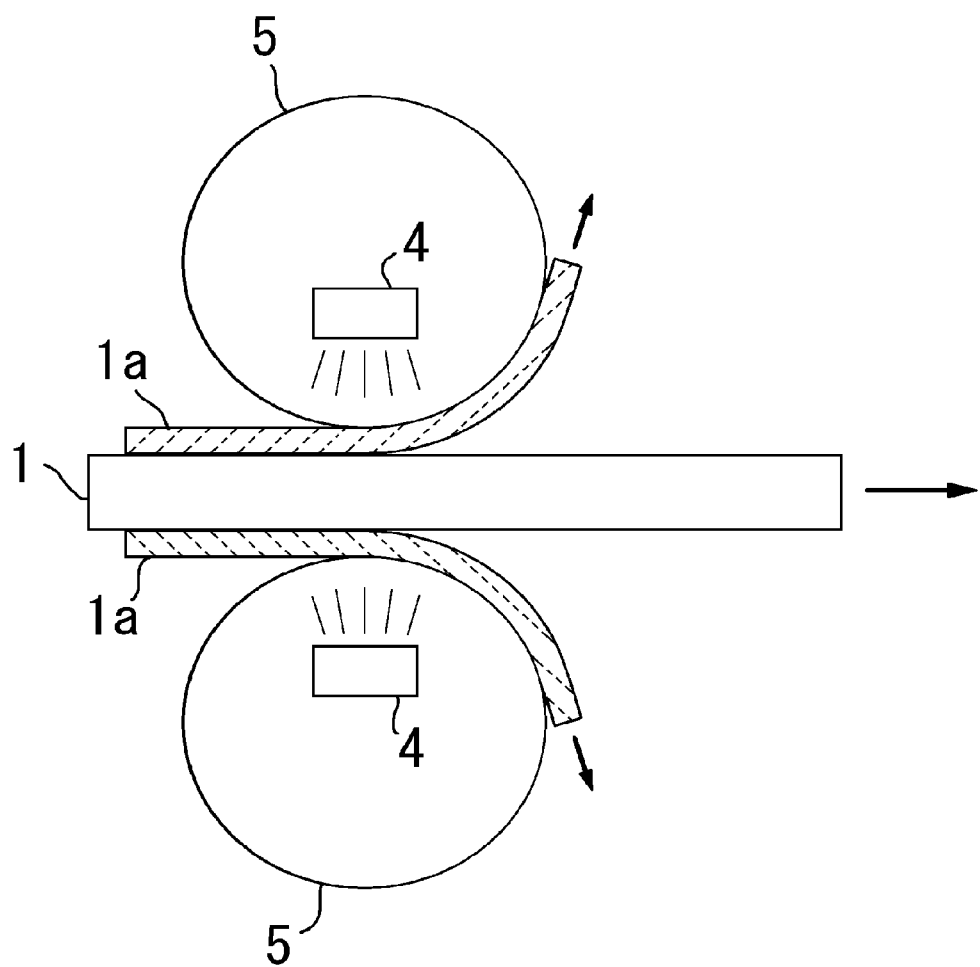

IMAGE REMOVING DEVICE, METHOD FOR RECYCLING RECORDING MATERIAL, AND IMAGE REMOVING METHOD

TECHNICAL FIELD

The present invention relates to a device that lifts off and removes an image comprising an image forming substance and formed on a surface of plastic recording material by xerography, which transfers a toner image to a recording material, from the surface of the recording material and to a method for the device.

BACKGROUND ART

As photocopiers and printers become sophisticated, these devices are being used for issuance of paper materials in various applications and forms, such as printing of photographs and video pictures and issuance of ledger sheets and slips, in addition to printing and photocopying of documents, and the amount of consumption of photocopying sheets and printer sheets at companies and homes is increasing.

Because the increase in the amount of imports of wood chips, which are a raw material of paper, is undesirable in terms of restraining deforestation, recycled paper produced by collecting used paper and breaking down the paper into regenerated pulp at a paper factory is being used in order to cope with the large consumption of paper, including photocopying sheets and printer sheets.

While recycled paper is mainly made from collected used paper and does not require wood resources, the use of recycled paper as a substitute for quality paper has not been established because of problems such as its quality which is still low compared with quality paper and high production costs which can lead to comparatively high prices.

As an alternative to such paper recycling, a technique for reusing used paper by removing an image formed on a surface of paper by xerography using a photocopier or the like has been proposed. For example, a method is known in which an adhesive liftoff member is laid on a surface of an image formed using an image forming substance of toner on paper and is heated and pressed appropriately to transfer the image forming substance to the liftoff member, thereby removing the image forming substance (for example, see Patent Document 1).

Another method is known in which a thermal-fusible image formed on a plastic sheet is lifted off and removed from the surface of the sheet by heating the surface of the image with interposition of a thermal-fusible liftoff body (for example, see Patent Document 2).

CITATION LIST

Patent Literature

Patent Document 1: Japanese Patent Laid Open No. 2007-279619
Patent Document 2: Japanese Patent Laid Open No. 1-297294

DISCLOSURE OF INVENTION

Technical Problem

The method of removing the image forming substance by transferring the image forming substance to the adhesive liftoff member laid on the surface of the image has a problem that the method requires heating the image forming substance on which the liftoff member is laid to a temperature at which cohesive failure occurs, adjustment of the heating temperature is difficult, and in addition, an image removing device using this method has a complicated and large configuration in which a heating means and a mechanism for adjusting heating temperature is incorporated, has inevitably high running costs and therefore the removal of the image forming substance for recycling of paper cannot be performed at low costs.

The method of lifting off and removing an image formed on a plastic sheet with interposition of the thermal-fusible liftoff body has a problem that because both of the thermal-fusible liftoff body and the image forming substance contain thermal-fusible resins, the thermal-fusible resins form a compatible blend as the sheet surface is heated and pressed and do not form an interface, therefore it is difficult to remove the image forming substance transferred from the sheet surface to the liftoff body.

While recycled paper is being used in place of paper in order to reduce the amount of consumption of wood resources as described above, high quality is required of photocopying sheets and printer sheets made of paper and the recycling rate is low under present circumstances. Further, because production of recycled paper from collected used paper requires some amount of wood resources, wood resources will still be consumed even if the rate of utilization of recycled paper increases. Therefore, the use of recycled paper does not provide a drastic solution for protecting the forest environment. Further, when color printing is performed on a photocopying sheet made of paper, toner is absorbed in the paper and colors become pale. When a recycled photocopying sheet made of recycled paper is used, the printed colors appear dull because of a lower degree of whiteness which makes the colors grayish. In either case, the image quality can degrade.

Polypropylene synthetic paper is used in products such as everyday items. Such synthetic paper is weak against heat and cannot be used in photocopiers and printers.

It will considerably help in protecting the forest environment if plastic sheets come into widespread use as a general-purpose material of a photocopying sheets and printer sheets because the plastic sheets can be produced without the use of wood resources. In addition, when color photocopying as described above is performed, images can be printed on plastic sheets at high quality because toner is not absorbed in the plastic sheets.

Further, photocopying sheets and printer sheets made of paper have certain thicknesses such that the sheets do no tear or become jammed in a photocopier or a printer, do not absorb moisture to generate wrinkles or curls, do not tear under heat and pressure during toner fusion, and offset does not occur when full-page printing is performed on both sides of a sheet. The use of plastic sheets in place of sheets made of paper has many practical benefits: because the plastic sheets can be made thinner than paper for photocopying and printing by photocopiers and printers, the plastic sheets can be more efficiently transported and delivered than sheets made of paper, reduction of the volume of and storage space for filed photocopied/printed matters can be achieved, and the workload for carrying a large amount of photocopied/printed matters can be reduced. In addition, plastic sheets have high resistance to water and can be stored for a long term. Plastic sheets do not need collection work for shredded sheets, which is needed for recycling of sheets made of paper.

The use of plastic sheets in place of paper and recycled paper as a recording material on which photocopying and printing are performed with photocopiers and printers has many benefits such as those described above. However, because it is waste of oil resources to discard plastic sheets once photocopying/printing is performed on the plastic sheets, it is preferable to enable a sheet to be repeatedly used as a recording material for photocopying and printers in any way such as by removing an image printed/photocopied on the surface of a sheet.

In light of the problems with the conventional art as described above, an object of the present invention is to configure an image removing device that has a simple configuration and can be used at low running costs and is capable of reliably and cleanly removing an image formed on a surface of a plastic recording material. Another object of the present invention is to enable a plastic recording material having an image formed thereon to be reused at a low cost.

Solution to Problem

To solve the problems described above, the present invention provides an image removing device that removes an image comprising an image forming substance and formed on a surface of a plastic recording material. The image removing device includes at least a means for applying an ultraviolet curable resin to the surface of the recording material on which the image is formed, and a means for irradiating the recording material with ultraviolet light, wherein the image removing device has a configuration provided in such a way that the image formed on the recording material is transferred to the ultraviolet curable resin and the ultraviolet curable resin attaches to a release body and separates from the recording material, thereby lifting off and removing the image from the recording material.

An image removing device according to the present invention removes an image comprising an image forming substance and formed on a surface of a plastic sheet which is a recording material by a method such as a xerography method, a thermal transfer method or an ink-jet method for transferring a toner image to a recording material using the plastic sheet as the recording material which is an information printing medium that is an alternative to paper such as a photocopying sheet.

As a plastic sheet which is the recording material, a sheet made of, for example, polypropylene, polyethylene terephthalate, a blend of polypropylene and polyethylene terephthalate, or other plastic materials, or a sheet surface-coated with a primer, or the like may be used.

FIG. 1 illustrates process steps for removing an image recorded on a recording material by an image removing device according to the present invention that is configured with the means described above.

Specifically, the image removing device according to the present invention is provided in such a way that an image forming substance 1a is removed from the surface of the recording material 1 by applying processing treatment by processing means including a resin applying means 3, an ultraviolet light emitting means 4, a release body 5, and a pressing means 6 which are disposed above a conveyance path while the recording material 1 which is a plastic sheet on which an image made of the image forming substance 1a is formed is being conveyed along the conveyance path by a conveying means 2.

First, the resin applying means 3 applies an ultraviolet curable resin to the surface of the recoding material 1 on which an image is formed, while the recording material 1 is being conveyed by the conveying means 2 as illustrated in FIG. 1(A). The ultraviolet curable resin is uniformly applied to an even thickness of approximately 3 µm, for example, on the entire surface on the side of the recording material 1 on which the image forming substance 1a is formed.

Then, the surface of the recording material 1 to which the ultraviolet curable resin has been applied is irradiated with ultraviolet light by the ultraviolet light emitting means 4.

Then, preferably, the release body 5 is laid on the surface of the recording material 1 to which ultraviolet curable resin has been applied and the surface of the release body 5 is brought into contact with the surface as illustrated in FIG. 1(B).

The release body 5 here may be made of, for example, a material that is hard and resistant to chemicals and is formed to have an even, smooth surface and from which stains can be easily removed and, if the recording material 1 is irradiated with ultraviolet light through the release body 5, a material that has a good light transmissivity, for example a material such as transparent glass, and may be formed in a size to cover the entire surface of one side of the recording material 1. The surface of the release body 5 made of glass may be coated with a material for improving the light transmissivity. The release body 5 may be formed of a material other than glass, provided that the release body 5 is hard and resistant to chemicals and formed to have an even, smooth surface.

In this case, because the image forming substance 1a formed on the recording material 1 needs to be reliably transferred to the ultraviolet curable resin, the ultraviolet curable resin applied to the surface of the recording material 1 needs to be as thin as possible in order to save on running costs, and the ultraviolet curable resin tends to fail to cure due to an effect of oxygen in the air during irradiation with ultraviolet light and therefore inclusion of oxygen (air) into the surface to which the ultraviolet curable resin has been applied needs to be prevented as far as possible to avoid exposure to oxygen, the release body 5 is preferably provided in such a way that the surface of the release body 5 is in close contact with the surface of the recording material 1 to which the ultraviolet curable resin has been applied. The pressing means 6 may be provided and the release body 5 may be pressed against the recording material 1 by the pressing means 6 while adjusting the contact pressure.

By uniformly applying the ultraviolet curable resin to the image forming substance 1a on the surface of the recording material 1 on which an image is formed and bringing the release body 5 into contact with the surface as described above, the ultraviolet curable resin is caused to adhere to both of the recording material 1 and the release body 5 and cures. During the curing, the image forming substance 1a formed on the recording material 1 transfers to and is held by the ultraviolet curable resin and, because the adhesive force of the ultraviolet curable resin to the release body 5 is greater than the adhesive force of the ultraviolet curable resin to the recording material 1, the image forming substance 1a is transferred from the recording material 1 to and held by the ultraviolet curable resin and the cured ultraviolet curable resin adheres to the surface of the release body 5, which has the adhesive force greater than the recording material 1, and separates from the recording material 1, thus the image forming substance 1a is removed from the recording material 1, as illustrated in FIG. 1(C).

FIG. 2 illustrates a mode in which an image formed on a recording material 1 is removed using a release body 5 having a cross-section curved in a substantially semi-circular arc.

As illustrated in the figure, the ultraviolet light emitting means 4 may be disposed in a position before the position in which the release body 5 is laid on the recording material 1, so that the recording material 1 is irradiated with ultraviolet light immediately before or at the same time the release body 5 is laid on the recording material 1 (*a*). Further, the ultraviolet light emitting means 4 may be disposed above the release body 5 so that the ultraviolet-curable-resin-applied surface of the recording material 1 on which the release body 5 is laid is irradiated with ultraviolet light that has passed through the release body 5 (*b*). Alternatively, the ultraviolet light emitting means 4 may be disposed in a position on the side opposite from the release body 5 across the recording material 1 being conveyed by the conveying means 2 so that the ultraviolet-curable-resin-applied surface of the recording material 1 on which the release body 5 is laid is irradiated with ultraviolet light that has passed through the recording material 1 (*c*).

Because the release body 5 is formed in a curved shape and is provided in such a way that the release body 5 contacts the recording material 1 conveyed on the conveyance path while rotating and is pressed against the recording material 1 by the pressing means 6 while the contact pressure is being adjusted as needed as illustrated in FIG. 2, the ultraviolet curable resin adheres to both of the recording material 1 and the release body 5 and cures, the image forming substance 1*a* on the surface of the recording material 1 transfers to and is held by the ultraviolet curable resin as the ultraviolet curable resin cures, and the ultraviolet curable resin adheres to the surface of the release body 5 which has a strong adhesive force and separates from the recording material 1, thereby the image forming substance 1*a* is lifted off and removed from the recording material 1. Such liftoff and removal process can be continuously performed concurrently with the recording material 1 being conveyed.

In this case, the cured ultraviolet curable resin that has adhered to the release body 5 together with the image forming substance 1*a* transferred from the recording material 1 can be scraped off from the surface of the release body 5 by a blade 7 disposed in such a manner that the blade 7 can slide on the surface of the release body 5. The image forming substance 1*a* and the ultraviolet curable resin removed from the release body 5 by the blade 7 are put in a collection vessel 8 provided alongside the blade 7 and is then discarded.

Advantageous Effects of Invention

The image removing device according to the present invention is capable of reliably and cleanly removing an image forming substance formed on a surface of a plastic recording material with a simple configuration, and enables recycling of the recording material at a low cost by using the image removing device to remove an image from the recording material.

BRIEF DESCRIPTION OF DRAWINGS

FIG. 1 FIGS. 1(A) to 1(C) are diagrams for explaining process steps for removing an image recorded on a recording material by an image removing device according to the present invention.

FIG. 2 shows another mode of the process steps in FIG. 1.

FIG. 3 shows a configuration of an image removing device according to one embodiment of the present invention.

FIG. 4 shows the image removing device viewed from the direction indicated by arrow IV-IV in FIG. 3.

FIG. 5 shows a configuration of an image removing device according to another embodiment of the present invention.

DESCRIPTION OF EMBODIMENTS

A preferable embodiment of the present invention will be described with reference to drawings.

FIGS. 1 and 2 illustrate a configuration of an example of an image removing device according to the present invention.

Like the image removing device illustrated in FIG. 1, the image removing device shown is configured in such a way that an image forming substance 1*a* is removed from the surface of a plastic recording material 1 by applying processing treatment by processing means including a resin applying means 3, an ultraviolet light emitting means 4, a release body 5, and a pressing means 6 which are disposed above a conveyance path while the recording material 1 on which an image made of the image forming substance 1*a* is formed is being conveyed along the conveyance path by the conveying means 2.

Specifically, the conveying means 2 includes a plurality of rollers disposed in the conveyance path that are rotated by a driving motor, not shown, and is provided in such a way that the conveying means 2 conveys a recording material 1 clamped between upper and lower rollers or supported on rollers along the conveyance path.

The resin applying means 3 includes a tank containing an appropriate amount of an ultraviolet curable resin and is provided so as to apply a predetermined amount of the ultraviolet curable resin to the entire surface of the recording material 1 on which an image is formed to a uniform thickness through a feeding port 3*a* provided at its lower end.

The ultraviolet light emitting means 4 includes a light emitting surface which is provided in a lower part of the ultraviolet light emitting means 4 and has the same width as the width of the recording material 1 and on which a plurality of LEDs are arranged in a row, and is disposed in a hollow interior portion of the release body 5 with the light emitting surface being directed downward so that the ultraviolet-curable-resin applied surface of the recording material in contact with the release body 5 can be irradiated with ultraviolet light from above in the vertical direction, as illustrated in FIG. 4.

While the plurality of LEDs in the ultraviolet light emitting means 4 shown are arranged in a row so that the recording material 1 is irradiated with ultraviolet light in a linear fashion along the width direction, a point light source made up of one or more LEDs, for example, may be provided movably along a guide rail so that the surface of the recording material 1 being conveyed is irradiated with ultraviolet light by scanning the recording material 1 back and forth along the width direction with the point light source.

The release body 5 is a rotating roll made of glass and is provided in such a way that the release body 5 is rotated by a driving roll 61, which also serves as a pressing means 6, and the outer periphery of the release body 5 is laid on the surface of the recording material 1 conveyed on the conveyance path and is pressed against the surface by the driving roll 61.

Specifically, as illustrated in FIG. 4, gears 5a and 61a provided on the outer peripheries of both ends of the release body 5 and the driving roll 61, respectively, are connected with each other, and rotation of a driving motor 9 which is connected to the driving roll 61 and rotates the driving roll 61 is transmitted to the release body 5 through the gears 5a and 61a, thereby rotating the release body 5.

The driving roll 61 is provided in such a way that the driving roll 61 can press down the release body 5 along a line segment that passes through the center O-O of the driving roll 61 and the release body 5 with an elastic member 61b such as a spring. A pressing roll 62 that presses the release body 5 upward along the line segment passing through the center O-O with elastic members 62a such as springs is provided in a position in which the conveying means 2 supporting the underside of the recording material 1 is provided. The driving roll 61 and the pressing roll 62 are provided in such a way that the contact pressure of the release body 5 to the recording material 1 can be adjusted as appropriate by appropriately adjusting the pressing force exerted by the elastic members 61b and 62a. The members such as the pressing roll 62 and the elastic members 62a which receive irradiation with ultraviolet light from the ultraviolet light emitting means 4 are preferably made of materials that are highly resistant to ultraviolet light.

A blade 7 formed of an elastic material such as rubber in the shape of a paddle for removing the ultraviolet curable resin and the image forming substance 1a attached to the release body 5 is disposed outside the release body 5 in a position downstream of the recording material 1 on the conveyance path, with an end of the blade 7 slidably in contact with the surface of the release body 5. A collection vessel 8 for collecting the ultraviolet curable resin and the image forming substance 1a removed from the release body 5 by the blade 7 is provide alongside the blade 7.

Further, while the ultraviolet curable resin and the image forming substance 1a attached to the release body 5 can be removed by scraping with the blade 7, a heating-wire heater 10 is installed near the outer periphery of the release body 5 under the blade 7 in order to facilitate the removal. The heating-wire heater 10 is intended to facilitate the removal of the ultraviolet curable resin and the image forming substance 1a from the surface of the release body 5 when hitting the blade 7, by heating the ultraviolet curable resin and image forming substance 1a attached to the release body 5. Instead of or in addition to the heating-wire heater 10, a device (not shown) that sprays water to the ultraviolet curable resin and the image forming substance 1a on the surface of the release body 5 may be provided to facilitate the removal of the ultraviolet curable resin and the image forming substance 1a attached to the release body 5 from the release body 5.

The image removing device according to the present embodiment configured as described above is capable of removing the image forming substance 1a from the surface of a recording material 1 by uniformly applying the ultraviolet curable resin to the surface of the recording material 1 on which an image is formed, irradiating the recording material 1 to which the ultraviolet curable resin has been applied with ultraviolet light, and brining the release body 5 into contact with the ultraviolet-curable-resin-applied surface, so that the ultraviolet curable resin adheres to both of the recording material 1 and the release body 5 and cures and, during the curing, the image forming substance 1a formed on the recording material 1 transfers to and is held by the ultraviolet curable resin, the ultraviolet curable resin adheres to the release body 5, which has a greater adhesive force, and separates from the recording material 1.

Further, the release body 5 rotates and contacts the conveyed recording material 1 with the contact pressure of the release body 5 to the recording material 1 being adjusted as appropriate by the driving roll 61 and the pressing roll 62, the image forming substance 1a on the surface of the recording material 1 is transferred to the ultraviolet curable resin while the recording material 1 is being conveyed, the ultraviolet curable resin continuously adheres to the surface of the release body 5 together with the image forming substance 1a, and the image forming substance 1a and the ultraviolet curable resin lift off from the surface of the recording material 1 to cause the image forming substance 1a to be removed from the surface of the recording material 1. Further, the ultraviolet curable resin and the image forming substance 1a attached to the release body 5 can be scraped off from the surface of the release body 5 with the blade 7 and can be put in the collection vessel 8.

It should be noted that the image removing device shown and the means that make up the image removing device are illustrative and the present invention is not limited to the configurations and modes shown and can be configured in combination with other appropriate means.

In a device configuration that removes an image forming substance 1a from both sides of a double-side printed material 1, that is, a recording material 1 on which images are formed on both sides using an image forming substance 1a, any of the devices described above and illustrated in FIGS. 1 to 3, for example, may be provided in two tiers so that a process is performed in which the device in the first tier removes the image forming substance 1a on the upper side of the recording material 1 and the device in the second tier removes the image forming substance 1a on the underside. Alternatively, resin applying means (not shown), ultraviolet light emitting means 4 and release bodies 5 may be opposed across a conveyance path of the recording material 1 as illustrated in FIG. 5, and the release bodies 5, 5 may be brought into contact with both sides on which an ultraviolet curable resin has been applied and are irradiated with ultraviolet light while the recording material 1 having image formed on both sides is being conveyed on the conveyance path, so that the image forming substance 1a on both sides is transferred to the ultraviolet curable resin, thereby removing the image forming substance 1a from both sides of the recording material 1 at the same time.

Further, a sensor may be provided in a position before the resin applying means 3 and may sense the image forming substance 1a formed on the recording material 1 to cause the ultraviolet curable resin to be selectively applied. By selectively applying the ultraviolet curable resin, running costs can be reduced and, in addition, damage to the recording material 1 during the image removal process can be minimized, thereby enabling recycling of the recording material 1.

REFERENCE SIGNS LIST

1 Recording material
2 Conveying means
3 Resin applying means
4 Ultraviolet light emitting means
5 Release body
6 Pressing means
7 Blade 8 Collection vessel
9 Driving motor
10 Heating-wire heater

The invention claimed is:

1. An image removing device that removes an image comprising an image forming substance and formed on a surface of a plastic recording material, the image removing device comprising:
    an applicator which applies an ultraviolet curable resin to the surface of the recording material on which the image is formed such that the surface of the recording material having said image is arranged in said image forming device such that said surface is located under said applicator and said surface is kept flat at the time of application of said ultraviolet curable resin;
    an ultraviolet light irradiator to irradiate the recording material; and
    means for conveying the recording material along a conveyance path on which a plurality of rollers that are rotated by a drive motor are disposed;
    wherein the image removing device has a configuration provided in such a way that the image formed on the recording material is transferred to the ultraviolet curable resin and the ultraviolet curable resin attaches to a release body and separates from the recording material, thereby lifting off and removing the image from the recording material.

2. The image removing device according to claim 1, comprising the release body that is provided above the conveyance path on which a plurality of rollers that are rotated by a drive motor are disposed of the recoding material and contacts the surface of the recording material to which the ultraviolet curable resin has been applied.

3. The image removing device according to claim 1, wherein the release body is formed of a light-transmissive material and formed on a even surface.

4. The image removing device according to claim 1, wherein the release body is a rotating roll disposed above the conveyance path on which a plurality of rollers that are rotated by a drive motor are disposed.

5. An image removing device that removes an image comprising an image forming substance and formed on a surface of a plastic recording material, the image removing device comprising:
    an applicator which applies an ultraviolet curable resin to the surface of the recording material on which the image is formed; and
    an ultraviolet light irradiator to irradiate the recording material;
    wherein the image removing device has a configuration provided in such a way that the image formed on the recording material is transferred to the ultraviolet curable resin and the ultraviolet curable resin attaches to a release body and separates from the recording material, thereby lifting off and removing the image from the recording material, and
    wherein said image removing device has a configuration provided in such a way that resin applying means, ultraviolet light emitting means and release bodies are opposed across a conveyance path of a recording material having images formed on both sides of the recording material and the images on both sides of the recording material are lifted off and removed while the recording material is being conveyed on the conveying path.

6. The image removing device according to claim 1, comprising a mechanism for adjusting contact pressure between the surface of the recording material on which the ultraviolet curable resin has been applied and the surface of the release body with a driver roll and a pressing roll.

7. A method for recycling a recording material, the method of lifting off and removing an image comprising an image forming substance and formed on a surface of a plastic recording material by using an image removing device to enable the recording material to be reused for forming an image on the surface of the recording material, wherein the image removing device comprises:
    an applicator which applies an ultraviolet curable resin to the surface of the recording material on which the image is formed; and
    an ultraviolet light irradiator to irradiate the recording material;
    wherein the image removing device has a configuration provided in such a way that the image formed on the recording material is transferred to the ultraviolet curable resin and the ultraviolet curable resin attaches to a release body and separates from the recording material, thereby lifting off and removing the image from the recording material.

8. An image removing method for removing an image comprising an image forming substance and formed on a surface of a plastic recording material, the method lifts off and removes the image forming substance from the surface of the recording material and the method comprises:
    applying an ultraviolet curable resin to the surface of the recording material on which the image is formed;
    irradiating the recording material with ultraviolet light;
    causing the ultraviolet curable resin to attach to a surface of a release body together with the image forming substance transferred to the ultraviolet curable resin; and
    removing the curable resin and the image forming substance attached to the surface of the release body from the release body.

9. The image removing method according to claim 8, further comprising bringing the release body into contact with the surface of the recording material to which the ultraviolet curable resin has been applied.

10. The image removing method according to claim 9, wherein the recording material in contact with the release body is irradiated with ultraviolet light.

11. The image removing method according to claim 8, wherein the recording material in contact with the release body is irradiated with ultraviolet light.

* * * * *